J. T. HOPKINS.
CLAMPING TOOL.
APPLICATION FILED OCT. 2, 1919.

1,405,587.

Patented Feb. 7, 1922.

Witness:
R. E. Hamilton

Inventor,
Jesse T. Hopkins
By Warren D. House,
His Attorney.

UNITED STATES PATENT OFFICE.

JESSE T. HOPKINS, OF KANSAS CITY, MISSOURI.

CLAMPING TOOL.

1,405,587.  Specification of Letters Patent.  Patented Feb. 7, 1922.

Application filed October 2, 1919. Serial No. 328,016.

*To all whom it may concern:*

Be it known that I, JESSE T. HOPKINS, a citizen of the United States, residing at Kansas City, in the county of Jackson and State of Missouri, have invented a certain new and useful Improvement in Clamping Tools, of which the following is a specification.

My invention relates to improvements in clamping tools. It is particularly well adapted for applying a clamping band or strip to a hose.

The object of my invention is to provide novel and efficient means for compressing and holding the hose and the fastener while the latter is being applied to the hose.

The novel features of my invention are hereinafter fully described and claimed.

In the accompanying drawing, which illustrates the preferred embodiment of my invention, Fig. 1 is a perspective view of my improved fastener, shown applied to a hose.

Similar reference characters designate similar parts in the different views.

Figure 1:
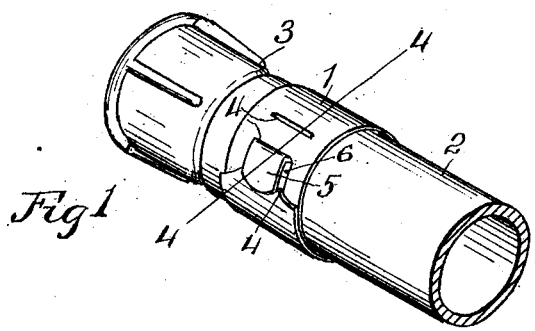

1 designates the fastening strip which may be a strip of flexible sheet metal adapted to be tightly wrapped around an ordinary hose 2 for attaching the same to a tubular member, such as a hose coupling member 3.

The strip 1 is provided with a longitudinal row of transverse slots 4, through two adjacent ones of which the reduced end 5 of the strip is adapted to be inserted.

In attaching the hose 2 to a coupling member 3, the strip 1 is bound tightly around the hose and the coupling member 3, the reduced end 5 of the strip being inserted through two of the slots 4 and under a bridge 6 which has been raised between said two slots. The reduced end 5 is then bent into a return bend, Figs. 1 and 4, thereby securely holding the strip 1 in position with the hose 2 compressed tightly against the coupling member 3.

Figure 2:
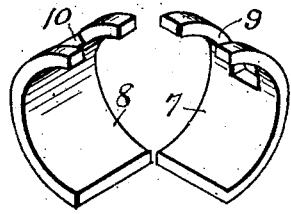
Fig. 2 is a perspective view of the two clamping members, which may be employed to hold the fastener and hose under compression when the fastener is being applied.
Figure 3:
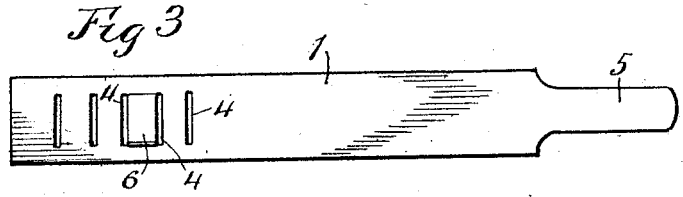
Fig. 3 is a plan view of the metal fastening strip in stretched out form.
Figures 4, 5:
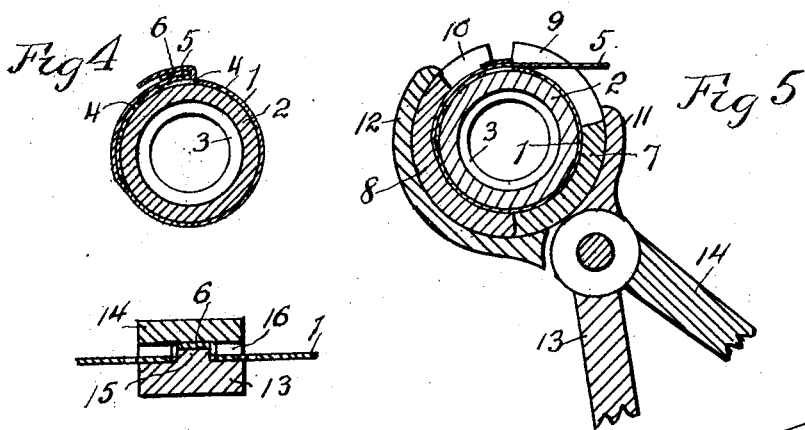
Fig. 4 is a cross section on the line 4—4 of Fig. 1.
Fig. 5 is a cross section showing the clamping members held under compression by the pliers against the fastening strip.
Figure 6:
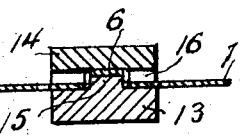
Fig. 6 is a cross section of the plier handles taken on the line 6—6 of Fig. 7, showing the fastening strip clamped by the plier handles in the formation of the bridge.
Figure 7:
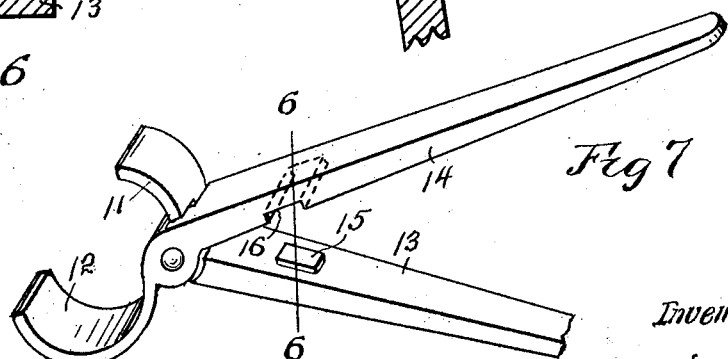
Fig. 7 is a perspective view, partly broken away, of the pliers which may be used for holding the clamping plates and for raising the bridge in the strip.

For compressing the strip 1 and the hose 2 when the strip is being applied to the hose, I provide two substantially semi-circular clamping plates 7 and 8, Figs. 2 and 5, which are provided respectively with two end slots 9 and 10, adapted to receive the reduced end 5, of the strip 1.

For forcing the clamping members 7 and 8 toward each other, I provide a pair of pliers having two jaws 11 and 12, provided respectively with handles 13 and 14.

For raising the bridge 6 in the strip, the handle 13 is provided with a raised portion 15 adapted to force the bridge portion 6 into a transverse slot 16 on the inner side of the handle 14.

In applying the fastener to a hose, the plier handles are first employed to raise the bridge 6 between two of the slots 4, such two slots depending upon the diameter of the hose.

The strip 1 is then wound around the hose and the coupling member 3, the two clamping members 7 and 8 being applied to opposite sides of the strip with the portion 5 of the strip lying in the slots 9 and 10 and inserted under the bridge 6. The plier jaws are then employed to squeeze together the clamping members 7 and 8, thus compressing the strip 1 and hose 2, as shown in Fig. 5.

The portion 5 is then bent into a return bend over the bridge 6, thereby locking the strip against the hose 2 with the latter tightly compressed on the member 3. The pliers and clamping members 7 and 8 may then be removed.

The slots 9 and 10 permit the portion 5 to be folded over into the return bend. It will be noted that when the clamping members 7 and 8 are compressed to the limit, they will embrace the strip 1 along the substantially full circumference of the hose 2, thereby holding the strip and hose under compression along the entire circumference, the clamping members being each a semi-circle. After the return bend has been made in the strip 1, and the clamping members removed, there will be no slack in the strip 1, and the hose will remain tightly clamped under the original amount of clamping pressure.

I do not limit my invention to the structure shown and described, as modifications, within the scope of the appended claims, may be made without departing from the spirit of my invention.

What I claim is:—

In a clamping tool, two clamping members adapted to embrace and hold under compression along the substantially full circumference of a hose a flexible metal strip, one of said members having a slot adapted to receive therethrough one end of the strip, and means for forcing said clamping members toward each other, substantially as set forth.

2. In a clamping tool, two substantially semi-circular clamping members adapted to embrace a strip around a hose, one of the members having a slot adapted to receive the strip, and a pair of pliers having two jaws adapted to embrace and clamp together said members, the outer ends of the jaws being spaced apart when the pliers are in the clamping position with respect to said members, substantially as set forth.

3. In a clamping tool, two substantially semi-circular clamping members adapted to embrace a strip around a hose, one of the members having a slot adapted to receive therethrough one end of the strip, the members being of such length that both ends of each member will abut against the ends of the other member when the members are in the clamping position, and means for forcing said members to and for holding them in the clamping position, substantially as set forth.

In testimony whereof I have signed my name to this specification.

JESSE T. HOPKINS.